(12) United States Patent
Assmann et al.

(10) Patent No.: US 6,841,614 B1
(45) Date of Patent: Jan. 11, 2005

(54) POLYMER GRANULES PRODUCED BY FLUIDIZED BED GRANULATION

(75) Inventors: Georg Assmann, Juechen (DE); Wilfried Raehse, Duesseldorf (DE); Rene Andres Artiga Gonzalez, Duesseldorf (DE); Beatrix Kottwitz, Duesseldorf (DE)

(73) Assignee: Henkel Kommanditgesellschaft auf Aktien, Duesseldorf (DE)

(*) Notice: Subject to any disclaimer, the term of this patent is extended or adjusted under 35 U.S.C. 154(b) by 0 days.

(21) Appl. No.: 09/830,730

(22) PCT Filed: Oct. 20, 1999

(86) PCT No.: PCT/EP99/07943

§ 371 (c)(1),
(2), (4) Date: Apr. 30, 2001

(87) PCT Pub. No.: WO00/25906

PCT Pub. Date: May 11, 2000

(30) Foreign Application Priority Data

Oct. 29, 1998 (DE) .......................... 198 50 100

(51) Int. Cl.⁷ .................................................. C08F 6/10
(52) U.S. Cl. .................... 524/556; 524/559; 524/48; 523/324; 510/434; 510/446
(58) Field of Search ................................ 524/556, 559, 524/48; 523/324; 510/434, 446

(56) References Cited

U.S. PATENT DOCUMENTS

| | | | |
|---|---|---|---|
| 3,234,258 A | 2/1966 | Morris | 260/460 |
| 4,062,647 A | 12/1977 | Storm et al. | 8/137 |
| 4,386,120 A | * 5/1983 | Sato et al. | 427/213 |
| 4,524,009 A | 6/1985 | Valenty | 252/89.1 |

(List continued on next page.)

FOREIGN PATENT DOCUMENTS

| | | |
|---|---|---|
| DE | 15 42 307 | 4/1970 |
| DE | 23 34 899 | 12/1983 |
| DE | 33 16 513 | 11/1984 |
| DE | 35 24 405 | 2/1987 |
| DE | 44 00 026 | 7/1995 |
| DE | 44 16 438 | 11/1995 |
| DE | 44 22 607 | 1/1996 |
| DE | 195 03 061 | 8/1996 |
| DE | 195 13 291 | 10/1996 |
| DE | 195 29 905 | 2/1997 |
| DE | 195 36 082 | 4/1997 |
| DE | 195 40 086 | 4/1997 |
| DE | 196 00 018 | 7/1997 |
| DE | 196 05 688 | 8/1997 |
| DE | 196 13 103 | 10/1997 |
| DE | 196 20 411 | 10/1997 |
| DE | 196 20 267 | 11/1997 |
| DE | 197 50 424 | 5/1999 |
| EP | 0 026 529 | 4/1981 |
| EP | 0 150 930 | 8/1985 |

(List continued on next page.)

*Primary Examiner*—David W. Wu
*Assistant Examiner*—Satya B Sastri
(74) *Attorney, Agent, or Firm*—Stephen D. Harper; Glenn E. J. Murphy (57) ABSTRACT

The invention relates to a method of producing soluble polymer granules which are suitable for use in washing and/or cleaning surfactants. According to said method, an aqueous preparation of the polymer which contains at least 30% by weight polymer, optionally in admixture with other washing and/or cleaning surfactant ingredients, is granulated and at the same time dried batchwise or continuously, preferably continuously, in a circular fluidized bed. In said fluidized bed, an eddy flow about the vertical axis of the apparatus is produced above the ground of the fluidized bed by means of an air inlet. The invention also relates to soluble, spherical polymer granules with a polymer content of 50 to 95% by weight and to washing or cleaning surfactants containing the inventive granules.

30 Claims, 2 Drawing Sheets

U.S. PATENT DOCUMENTS

| | | | |
|---|---|---|---|
| 4,639,325 A | 1/1987 | Valenty et al. | 252/89.1 |
| 4,664,839 A | 5/1987 | Rieck | 252/175 |
| 4,698,174 A * | 10/1987 | Denzinger et al. | 510/533 |
| 4,737,306 A | 4/1988 | Wichelhaus et al. | 252/95 |
| 4,816,553 A | 3/1989 | Baur et al. | 528/245 |
| 4,820,439 A | 4/1989 | Rieck | 252/135 |
| 4,985,553 A | 1/1991 | Fuertes et al. | 536/124 |
| 5,075,041 A | 12/1991 | Lutz | 252/548 |
| 5,348,644 A | 9/1994 | Maroy et al. | 208/153 |
| 5,501,814 A | 3/1996 | Engelskirchen et al. | 252/174.17 |
| 5,516,447 A | 5/1996 | Bauer et al. | 252/89.1 |
| 5,541,316 A | 7/1996 | Engelskirchen et al. | 510/471 |
| 5,780,420 A | 7/1998 | Breuer et al. | 510/466 |
| 5,821,360 A | 10/1998 | Engelskirchen et al. | 536/124 |
| 5,922,670 A | 7/1999 | Knuebel et al. | 510/426 |
| 5,959,101 A | 9/1999 | Engelskirchen et al. | 536/124 |
| 6,153,576 A | 11/2000 | Blum et al. | 510/311 |
| 6,187,055 B1 | 2/2001 | Kottwitz et al. | 8/137 |
| 6,200,946 B1 | 3/2001 | Blum et al. | 510/372 |

FOREIGN PATENT DOCUMENTS

| | | |
|---|---|---|
| EP | 0 164 514 | 12/1985 |
| EP | 0 232 202 | 8/1987 |
| EP | 0 272 030 | 6/1988 |
| EP | 0 280 223 | 8/1988 |
| EP | 0 327 927 | 8/1989 |
| EP | 0 368 137 | 5/1990 |
| EP | 0 392 592 | 10/1990 |
| EP | 0 421 644 | 4/1991 |
| EP | 0 427 349 | 5/1991 |
| EP | 0 443 651 | 8/1991 |
| EP | 0 446 982 | 9/1991 |
| EP | 0 453 003 | 10/1991 |
| EP | 0 458 397 | 11/1991 |
| EP | 0 458 398 | 11/1991 |
| EP | 0 472 042 | 2/1992 |
| EP | 0 525 239 | 2/1993 |
| EP | 0 542 496 | 5/1993 |
| EP | 0 544 490 | 6/1993 |
| EP | 0 544 519 | 6/1993 |
| EP | 0 549 271 | 6/1993 |
| EP | 0 549 272 | 6/1993 |
| EP | 0 603 207 | 6/1994 |
| EP | 0 652 937 | 5/1995 |
| EP | 0 658 189 | 6/1995 |
| EP | 0 703 292 | 9/1995 |
| EP | 0 693 550 | 1/1996 |
| EP | 0 759 463 | 2/1997 |
| JP | 58/217598 | 12/1983 |
| JP | 93/339896 | 12/1993 |
| WO | WO90/13533 | 11/1990 |
| WO | WO92/11347 | 7/1992 |
| WO | WO92/18962 | 10/1992 |
| WO | WO93/08251 | 4/1993 |
| WO | WO93/16110 | 8/1993 |
| WO | WO94/02597 | 2/1994 |
| WO | WO94/02618 | 2/1994 |
| WO | WO94/13775 | 6/1994 |
| WO | WO94/18314 | 8/1994 |
| WO | WO94/23005 | 10/1994 |
| WO | WO94/23053 | 10/1994 |
| WO | WO94/28030 | 12/1994 |
| WO | WO95/07303 | 3/1995 |
| WO | WO95/07331 | 3/1995 |
| WO | WO95/07350 | 3/1995 |
| WO | WO95/12619 | 5/1995 |
| WO | WO95/19953 | 7/1995 |
| WO | WO95/19954 | 7/1995 |
| WO | WO95/19955 | 7/1995 |
| WO | WO95/20029 | 7/1995 |
| WO | WO95/20608 | 8/1995 |
| WO | WO95/27775 | 10/1995 |
| WO | WO96/34092 | 10/1996 |
| WO | WO96/34108 | 10/1996 |

* cited by examiner

POLYMER GRANULES PRODUCED BY FLUIDIZED BED GRANULATION

CROSS-REFERENCE TO RELATED APPLICATIONS

This application is a U.S. National Stage application filed under 35 U.S.C. § 371, claiming priority under 35 U.S.C. §§ 119 and 365 of International Application No. PCT/EP99/07943, filed Oct. 20, 1999, in the European Patent Office, and DE 198 50 100.5, filed Oct. 29, 1998, in the German Patent Office.

FIELD OF THE INVENTION

This invention relates to a process for the production of polymer-containing granules whose solubility and flow behavior makes them suitable for use in detergents and/or cleaning compositions, to polymer granules which represent a suitable admixing component for detergents and/or cleaning compositons and to detergents and/or cleaning compositions containing these granules.

BACKGROUND OF THE INVENTION

The addition of polymers to powder-form detergents often leads to a deterioration in storage stability, the detergents agglomerate and lose their flowability. Because of this, the polymers are preferably used in the form of granules. Accordingly, the production and use of polymer-containing granules is the subject of numerous literature references.

European patent application EP-A0 759 463 describes detergent compositions consisting of a basic powder to which commercially available granules of a polycarboxylate copolymer (for example Sokalan CP5®) are subsequently added. The subsequent addition of the polymer in granular form stabilizes the bleaching system by comparison with compositions where the polymer is present in the basic powder.

An additive for detergents containing 20 to 80% by weight polymeric polycarboxylate besides 20 to 80% by weight nitrilotriacetate is described in U.S. Pat. No. 4,698,174. The function of the nitrilotriacetate is to reduce the hygroscopicity of the polycarboxylate.

EP-A0 368 137 and DE-A-33 16 513 are concerned with zeolite granules which also contain polycarboxylate polymer. The granules according to DE-A-33 16 513 are produced by spray drying and contain polymeric polycarboxylates in quantities of at least 5% by weight to reduce the abrasion of the zeolite granules. EP-A0 368 137 describes a process for the production of granules containing 2 to 15% by weight polycarboxylate. A homogeneous powder-form mixture is first prepared from the zeolite and the polycarboxylate and then agglomerated and the agglomerate obtained is dried.

WO 94/13775 relates to a process for the production of powder-form detergents containing polyvinyl pyrrolidone (PVP). In order to maintain the flowability of the detergent, the PVP is added to the powder-form detergent containing the other detergent ingredients completely or partly in the form of a separate mixture (PVP concentrate) with other powder-form detergent ingredients. The PVP concentrate may contain 10 to 50% by weight PVP and preferably 40 to 80% by weight inorganic carrier salts besides small quantities of water. These concentrates are preferably produced by spray drying.

A detergent additive containing 15 to 60% by weight PVP, 5 to 90% by weight carrier material, 5 to 60% by weight salt and 0.5 to 30% by weight binder is described in EP-B0 652 937. The additive is produced by mixing PVP, carrier and salt and then spraying on the binder. The advantage of this additive is that detergents which contain it do not agglomerate as quickly as comparable compositions to which PVP is directly added because the carrier material first binds with the moist PVP.

A discoloration-inhibiting detergent additive which contains at least partly water-soluble polymer constituents based on N-vinyl pyrrolidone or N-vinyl imidazole or N-vinyl oxazoline in combination with a cationic compound and which is odorless, even in combination with alkaline detergent ingredients, is described in EP-A0 327 927. This additive is obtained by mixing the starting materials together and drying the resulting mixture with heated air.

European patent application EP-A0 421 664 is also concerned with granules that can be used in detergents. The granules contain at least 10% by weight of polymer and at least 20% by weight of a water-soluble inorganic component or at least 20% by weight of polymer in addition to at least 20% by weight of a water-insoluble inorganic component and have a bulk density of at least 700 g/l. Preferred granules contain 20 to 40% by weight of polymer. The granules are produced by mixing a solution or a slurry of the polymer with the inorganic component and granulating the resulting mixture in the presence of heat.

European patent EP-B0 658 189 describes detergents which contain at least two granular components, one component being a granular admixing component of polymeric polycarboxylates. The polymer granules have a bulk density of 350 to 850 g/l and are conventionally produced, for example by drying of polymer solutions, subsequent granulation and optionally sizing/grading. The polymer solution is preferably dried in a spray drying tower or in a fluidized bed. Unfortunately, the patent specification in question does not provide exact details of the production process or the composition of the polymer granules.

The granules known from the prior art generally have low polymer contents or contain additives which are intended to limit the hygroscopicity of the compounds and hence their water content. None of the processes described hitherto is generally suitable for the production of granules of polymeric detergent ingredients which have a high polymer content, are readily soluble, stable in storage and free-flowing and—carriers apart—contain no other additives.

Accordingly, the problem addressed by the present invention was to provide a process which would be suitable for the production of readily soluble, flowable and carrier-containing granules with high polymer contents.

Figure 1:
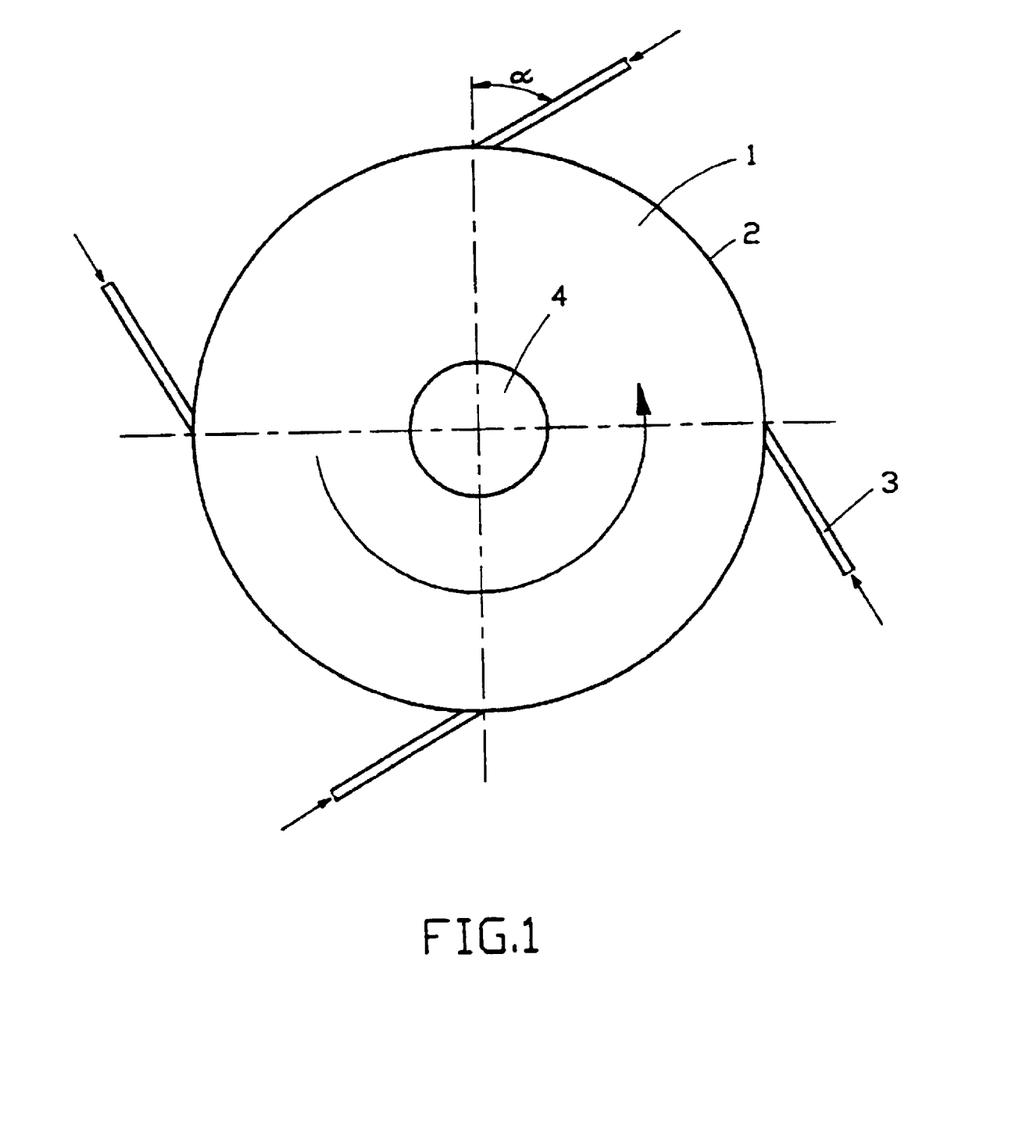
FIG. 1 illustrates a diffuser plate in the process of the invention.
Figure 2:
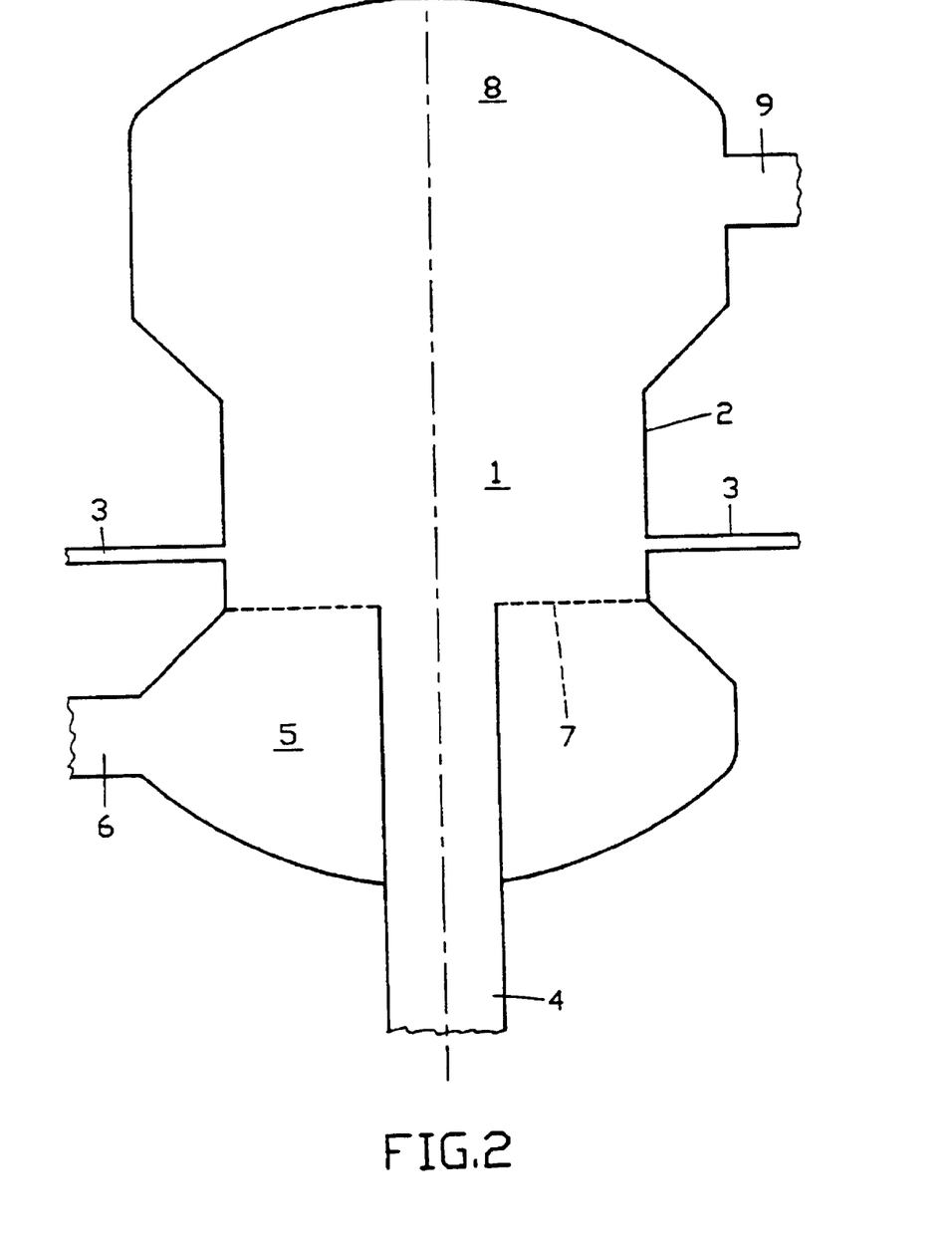
FIG. 2 illustrates a fluidized bed dryer in the process of the invention.

The fluidized bed used to produce the granules of the Examples, as illustrated in FIGS. 1 and 2, has a cylindrical fluidized bed chamber 1 from which a conical widening leads to a cylindrical stabilizing chamber 8 onto which the waste air outlet 9 is welded. Air is supplied primarily via the inflowing air channel 6 which opens into the inflowing air distribution chamber 5 from which the inflowing air passes through the diffusor 7 into the fluidized bed chamber 1. According to the invention, the fluidized bed dryer also has an air supply system above the diffusor 7. This air supply system is formed by two air injection tubes 3 which are arranged at a uniform distance apart from one another and at an angle of incidence α=60° on the outer wall 2. In this fluidized bed dryer, the usual resting height of the bed material is 0.2 m and the air injection tubes 3 are situated at 30% of that height. Discharge from the continuously operated fluidized bed takes place via the grading tube 4.

DESCRIPTION OF THE INVENTION

The present invention therefore relates to a process for the production of soluble polymer granules suitable as an additive in detergents and/or cleaning compositions, characterized in that a water-based preparation of the polymer which contains at least 30% by weight of polymer is granulated and simultaneously dried in a round fluidized bed in which an eddy flow is produced about the vertical axis of the dryer via an air inlet above the diffusor plate.

This additional eddy flow about the vertical axis of the fluidized bed dryer produces a uniform distribution of temperature in the fluidized bed tower. In addition, the influence of the nozzles which are intended finely to disperse the liquid sprayed in is reduced so that drying is quick and uniform throughout the fluidized bed. The quality of the granules is thus improved, the granules obtained appear more uniform and have a narrow size distribution on leaving the fluidized bed and the individual particles are substantially spherical.

According to the invention, the eddy flow can be produced by the provision of air injection tubes above the diffusor plate at uniform intervals apart and at the same level or at different levels above the diffusor plate. In one preferred embodiment of the invention, the level at which the air injection tubes are disposed is dependent on the resting height of the bed material. The air injection tubes are located below the upper limit of the resting height of the bed material, preferably at a level corresponding to at most 50% of the resting height and, in one most particularly preferred embodiment, at a level corresponding to 10 to 30% of the resting height of the bed material.

According to the invention, the additional air is supplied through at least two such injection tubes and preferably through four injection tubes. Irrespective of their number, the tubes are all arranged at the same level and at uniform intervals apart.

The angle of incidence a of the air injection tubes is also crucial to the spin effect produced by the inflowing air. The angle of incidence a is gauged so that α=90° corresponds to a tangential position and α=0° corresponds to a radial position of the injection tubes relative to the round fluidized bed. According to the invention, incidence angles of at least 30° and at most 90° are preferred because, with incidence angles α of less than 30°, turbulence is primarily generated, i.e. no circular eddy flow is created. Angles of incidence of 30 to 75° are particularly preferred, the best flow conditions being achieved at 45 to 70° and most particularly at 60°. With incidence angles of more than 75°, a strong marginal flow is produced with the result that tacky particles adhere firmly to the wall under the effect of the centrifugal force.

In the injection tubes, the air is preferably transported at a rate of 20 to 30 m/s and may optionally be used for pneumatically transporting solids or seed material into the fluidized bed. This additional air makes up 3 to 30% and preferably 5 to 15% of the total drying air. In one embodiment, the air introduced through the injection tubes has the same temperature as the air introduced through the diffusor plate. However, if the air injection tubes are used for pneumatically conveying solids, it may even be preferable to introduce cold air for this purpose.

The carrier materials used in the process according to the invention may be inorganic and/or organic.

An inorganic carrier is finely crystalline, synthetic zeolite containing bound water, preferably zeolite A, X and/or P. Mixtures of A, X and/or P are also suitable. A particularly preferred zeolite P is, for example, zeolite MAP (Doucil A24®, a product of Crosfield). A co-crystallized sodium/potassium-aluminium silicate of zeolite A and zeolite X, which is marketed, for example, under the name of VEGOBOND AX® (by Condea Augusta S.p.A.), is also of particular interest The zeolite may be used as a spray-dried powder or even as an undried stabilized suspension still moist from its production. Where the zeolite is used in the form of a suspension, the suspension may contain small additions of nonionic surfactants as stabilizers, for example 1 to 3% by weight, based on zeolite, of ethoxylated $C_{12-18}$ fatty alcohols containing 2 to 5 ethylene oxide groups, $C_{12-14}$ fatty alcohols containing 4 to 5 ethylene oxide groups or ethoxylated isotridecanols. Suitable zeolites have a mean particle size of less than 10 μm (volume distribution, as measured by the Coulter Counter method) and contain preferably 10 to 22% by weight and, more preferably, 15 to 22% by weight of bound water.

Other suitable carriers are, for example, amorphous alkali metal silicates (so-called water glasses) or crystalline layer silicates, sodium carbonate, sodium bicarbonate, sodium sulfate and trisodium citrate. Other possible carriers are mixtures of the above-mentioned carriers. Preferred carriers are Inorganic carriers, more particularly sodium carbonate, sodium sulfate or zeolites.

The polymer granules produced by the process have carrier material contents below 50% by weight, based on the final granules. Since highly concentrated polymer granules are preferred for the purposes of the invention, carrier material contents below 40% by weight and more particularly below 25% by weight are particularly preferred.

The fluidized bed chamber used in the process according to the invention is round; the tower may be cylindrical, i.e. may be constant in diameter over its height. According to the invention, however, preferred fluidized bed chambers are those where the fluidizing zone is conical and widens upwards and only the adjoining stabilizing zone is cylindrical after a conical transition section. Irrespective of the geometry of the fluidized bed chamber, the process may be carried out in batches or continuously, the continuous variant being preferred for the purposes of the invention.

To produce the polymer granules by the process according to the invention, the polymer solution is introduced into the fluidized bed through a one-component or multicomponent nozzle or through several nozzles. The carrier component and any other solids present are either pneumatically "sprayed in" through one or more blow lines, in which case they are added either before or during spraying of the polymer solution, or are added as a solution or suspension in admixture with the polymer solution, in which case these liquid constituents are mixed either before spraying or in the nozzle itself. The arrangement of the nozzle or nozzles and the spraying direction is not subject to any limitations providing the liquid components are substantially uniformly distributed in the fluidized bed. In one preferred embodiment of the invention, the carrier is mixed with the polymer solution before spraying and the solution or slurry is sprayed into the fluidized bed through a nozzle.

Preferred fluidized beds have base plates (diffusor plates) at least 0.4 m in diameter. Particularly preferred fluidized beds have a base/diffusor plate between 0.4 and 5 m in diameter, for example 1.2 m or 2.5 m in diameter. However, fluidized beds with a base/diffusor plate larger than 5 m in diameter are also suitable. The base plate may be a perforated plate or a Conidur plate (a product of Hein & Lehmann, Federal Republic of Germany) or a wire gauze or a combination of a perforated plate and a gauze as described in earlier German patent application 197 50 424.8. A Conidur plate in particular is capable of supporting the spin effect of the additional air supply.

According to the invention, the process is preferably carried out at fluidizing air flow rates of 1 to 8 m/s and, more particularly, 1.5 to 5.5 m/s. The granules are advantageously discharged from the fluidized bed via a sizing/grading stage. Sizing/grading is carried out, for example, using a sieve or by a stream of drying air flowing in countercurrent (grading air) which is controlled in such a way that only particles beyond a certain particle size are removed from the fluidized bed while smaller particles are retained therein. In one preferred embodiment, the air flowing in from below is made up of the heated or unheated grading air and the heated bottom air. The bottom air temperature is preferably between 80 and 400° C. and more preferably between 90 and 350° C., fluidizing air temperatures above 150° C. being particularly favorable in the process according to the invention because temperatures as high as these accelerate drying. The fluidizing air cools through heat losses and through the heat of evaporation of the constituents of the solvent. In one particularly preferred embodiment, the temperature of the fluidizing air about 5 cm above the base/diffusor plate is in the range from 60 to 120° C. and preferably in the range from 70 to 100° C. The air exit temperature is preferably between 60 and 120° C. and more particularly below 100° C.

In fluidized bed granulation, the water content of the products may be adjusted to virtually any value. In the process according to the invention, drying takes place basically at the same time as granulation in the fluidized bed. In one preferred according to the invention, the effect of drying is that the polymer content of the granules—based on their total weight—is higher than the polymer content of the solution used. In one particularly preferred embodiment, the granules obtained have a water content of at least 5% by weight and preferably of at least 7% by weight.

If the granules are discharged from the fluidized bed against a stream of sizing/grading air, as described in EP-B-0 603 207, the granules obtained as a result of this grading are free from dust, i.e. are above 0.1 mm in size. According to the invention, preferred granules have a $d_{50}$ value of 0.4 to 2.5 mm. In one particularly preferred embodiment, particles larger than 1.6 mm in size in fine narrow particle size distributions are returned. This coarse-particle fraction may either be added to the fluidized bed as a solid component after grinding or is redissolved and sprayed into the fluidized bed.

In the granulation process according to the invention, solid carrier material may be continuously introduced into the fluidized bed as a so-called powdering agent to maintain the fluidized-bed granulation process. Zeolite, more particularly zeolite A or P, is preferably used as the powdering material. These powdering materials additionally prevent the moist granules from becoming tacky during the granulation step and thus promote fluidization and drying to form the desired product. The particle size of the powdering material is below 100 µm so that the granules obtained contain between 1 and 4% by weight of the powdering material. Although this variant can be of advantage for the production of granules by the process according to the invention, it is by no means absolutely essential.

Any soluble polymers which represent typical detergent additives are suitable for processing in this process. According to the invention, the polymers are preferably used in the form of aqueous solutions, preferably with a polymer content of 30 to 60% by weight and more particularly in the range from 35 to 45% by weight.

In one preferred embodiment of the invention, aqueous polymeric polycarboxylate solutions are used. Polymeric polycarboxylates in the context of the invention are homopolymers or copolymers of acrylic, methacrylic or maleic acid, copolymers of these acids with vinyl ethers, such as vinyl methyl ether or vinyl ethyl ether, vinyl esters, such as vinyl acetate or vinyl propionate, acrylamide, methacrylamide and ethylene, propylene or styrene, and the water-soluble salts of these polymers. The sodium salts of such homo- or copolymeric polycarboxylic acids are particularly preferred. If one of the components of a copolymer has no acid function, its percentage content in the polymer in the interests of high solubility in water is no more than 50 mol-% and is preferably less than 30 mol-%. Homo- and copolymers of acrylic, methacrylic and maleic acid have proved to be particularly suitable, copolymers of acrylic acid with maleic acid containing 50 to 90% by weight of acrylic acid and 50 to 10% by weight of maleic acid being most particularly suitable. Polycarboxylate polymers with a molecular weight of 500 to 150,000 g/mol and more particularly in the range from 500 to 100,000 g/mol (measured against polystyrene as standard) are also preferred.

In another preferred embodiment of the invention, polyvinyl pyrrolidones with a molecular weight of 1,000 to 200,000 g/mol and more particularly in the range from 1,000 to 100,000 g/mol are used as polymers. Polyvinyl pyrrolidones (PVPs) in this context are water-soluble polymers which are formed in the polymerization of substituted or unsubstituted vinyl pyrrolidone monomers. They may be both homopolymers and copolymers where at least one of the monomers is a vinyl pyrrolidone and the vinyl pyrrolidone content of the copolymer is at least 50 mol-%. Other suitable comonomers are, for example, acrylonitrile or maleic anhydride.

Besides these polymers, polymers of natural origin may also be present in the granules according to the invention. Such polymers are, for example, oligomers or polymers of carbohydrates which may be obtained by partial hydrolysis of starches. The hydrolysis may be carried out by standard methods, for example acid- or enzyme-catalyzed methods. The end products are preferably hydrolysis products with average molecular weights of 400 to 500,000. A polysaccharide with a dextrose equivalent (DE) of 0.5 to 40 and, more particularly, 2 to 30 is preferred, the DE being an accepted measure of the reducing effect of a polysaccharide by comparison with dextrose which has a DE of 100. Both maltodextrins with a DE of 3 to 20 and dry glucose syrups with a DE of 20 to 37 and also so-called yellow dextrins and white dextrins with relatively high molecular weights of 2,000 to 30,000 may be used. A preferred dextrin is described in British patent application 94 19 091. The oxidized derivatives of such dextrins are their reaction products with oxidizing agents which are capable of oxidizing at least one alcohol function of the saccharide ring to the carboxylic acid function. Dextrins thus oxidized and processes for their production are known, for example, from European patent applications EP-A-0 232 202, EP-A-0 427 349, EP-A0 472 042 and EP-A-0 542 496 and from International patent applications WO 92/18542, WO 93/08251, WO 93/16110, WO-A-94/28030, WO 95/07303, WO 95/12619 and WO 95/20608. An oxidized oligosaccharide according to German patent application DE-A-196 00 018 is also suitable. A product oxidized at $C_6$ of the saccharide ring can be particularly advantageous.

In one preferred embodiment, the dextrins are incorporated in the granules together with polymeric polycarboxylates. The process is preferably managed in such a way that the ratio of dextrin to polymeric polycarboxylate in the product is 4:1 to 1:2. Either a homogeneous solution of the two polymers may be sprayed into the granulation chamber or the dextrin may be introduced first in solid form and a solution of the polycarboxylate subsequently sprayed in. In both embodiments, the polymeric polycarboxylate tends to coat the dextrin in the granules, this effect naturally being particularly pronounced where the solid dextrin is introduced first. It is precisely this effect of coating of the dextrin by the polycarboxylate which makes granulation of the dextrin possible in the first place because, on their own, the dextrins would become very tacky and would agglomerate during drying. In addition, the coating protects the dextrins against heat stress during the granulation process.

The present invention also relates to soluble polymer granules which are suitable as an additive in detergents and/or cleaning compositions, are spherical and contain 50 to 95% by weight of polymer and at least one admixing component.

Suitable polymers for these soluble polymer granules are any polymers which represent typical detergent additives. One preferred embodiment of the invention is characterized by the use of polymeric polycarboxylates. Polymeric polycarboxylates in the context of the invention are homopolymers or copolymers of acrylic, methacrylic or maleic acid, copolymers of these acids with vinyl ethers, such as vinyl methyl ether or vinyl ethyl ether, vinyl esters, such as vinyl acetate or vinyl propionate, acrylamide, methacrylamide and ethylene, propylene or styrene, and the water-soluble salts of these polymers. The sodium salts of such homo- or copolymeric polycarboxylic acids are particularly preferred. If one of the components of a copolymer has no acid function, its percentage content in the polymer in the interests of high solubility in water is no more than 50 mol-% and is preferably less than 30 mol-%. Homo- and copolymers of acrylic, methacrylic and maleic acid have proved to be particularly suitable, copolymers of acrylic acid with maleic acid containing 50 to 90% by weight of acrylic acid and 50 to 10% by weight of maleic acid being most particularly suitable. Polycarboxylate polymers with a molecular weight of 500 to 150,000 g/mol and more particularly in the range from 500 to 100,000 g/mol are also preferred.

In another preferred embodiment of the invention, the polymers are formed by polyvinyl pyrrolidones with a molecular weight of 1,000 to 200,000 g/mol and more particularly in the range from 1,000 to 100,000 g/mol. Polyvinyl pyrrolidones (PVPs) in this context are water-soluble polymers which are formed in the polymerization of substituted or unsubstituted vinyl pyrrolidone monomers. They may be both homopolymers and copolymers where at least one of the monomers is a vinyl pyrrolidone and the vinyl pyrrolidone content of the copolymer is at least 50 mol-%. Other suitable comonomers are, for example, acrylonitrile or maleic anhydride.

Besides these polymers, polymers of natural origin may also be present in the granules according to the invention. Such polymers are, for example, oligomers or polymers of carbohydrates which may be obtained by partial hydrolysis of starches. The hydrolysis may be carried out by standard methods, for example acid- or enzyme-catalyzed methods.

The end products are preferably hydrolysis products with average molecular weights of 400 to 500,000. A polysaccharide with a dextrose equivalent (DE) of 0.5 to 40 and, more particularly, 2 to 30 is preferred, the DE being an accepted measure of the reducing effect of a polysaccharide by comparison with dextrose which has a DE of 100. Both maltodextrins with a DE of 3 to 20 and dry glucose syrups with a DE of 20 to 37 and also so-called yellow dextrins and white dextrins with relatively high molecular weights of 2,000 to 30,000 may be used. A preferred dextrin is described in British patent application 94 19 091. The oxidized derivatives of such dextrins are their reaction products with oxidizing agents which are capable of oxidizing at least one alcohol function of the saccharide ring to the carboxylic acid function. Dextrins thus oxidized and processes for their production are known, for example, from European patent applications EP-A-0 232 202, EP-A-0 427 349, EP-A-0 472 042 and EP-A-0 542 496 and from International patent applications WO 92/18542, WO 93/08251, WO 93/16110, WO-A-94/28030, WO 95/07303, WO 95/12619 and WO 95/20608. An oxidized oligosaccharide according to German patent application DE-A-196 00 018 is also suitable. A product oxidized at $C_8$ of the saccharide ring can be particularly advantageous.

The granules have a polymer content of 50 to 95% by weight. According to the invention, particularly preferred granules contain 75 to 90% by weight of polymers. If the granules contain dextrins, these dextrins are preferably present in the granules together with polymeric polycarboxylates, the ratio of dextrin to polymeric polycarboxylate in the granules preferably being in the range from 4:1 to 1:2. In these granules, the polymeric polycarboxylate coats the dextrin and thus forms a layer around the dextrin which protects it from the effects of chemicals and heat.

The polymer granules according to the invention also contain an admixing component. In the context of the invention, an admixing component is a substance which is suitable for use as a carrier material. The carrier materials used may be inorganic and/or organic, inorganic carrier materials being preferred.

One such inorganic carrier is finely crystalline, synthetic zeolite containing bound water, preferably zeolite A, X and/or P. Mixtures of A, X and/or P are also suitable. A particularly preferred zeolite P is, for example, zeolite MAP® (a product of Crosfield). A co-crystallized sodium/potassium-aluminium silicate of zeolite A and zeolite X, which is marketed, for example, under the name of VEGOBOND AX® (by Condea Augusta S.p.A.), is also of particular interest The zeolite may be used as a spray-dried powder or even as an undried stabilized suspension still moist from its production. Where the zeolite is used in the form of a suspension, the suspension may contain small additions of nonionic surfactants as stabilizers, for example 1 to 3% by weight, based on zeolite, of ethoxylated $C_{12-18}$ fatty alcohols containing 2 to 5 ethylene oxide groups, $C_{12-14}$ fatty alcohols containing 4 to 5 ethylene oxide groups or ethoxylated isotridecanols. Suitable zeolites have a mean particle size of less than 10 µm (volume distribution, as measured by the Coulter Counter method) and contain preferably 10 to 22% by weight and, more preferably, 15 to 22% by weight of bound water.

Other suitable carriers are, for example, amorphous alkali metal silicates (so-called waterglasses) or crystalline layer silicates, sodium carbonate, sodium bicarbonate, sodium sulfate and trisodium citrate. Other possible carriers are mixtures of the above-mentioned carriers. Preferred carriers are inorganic carriers, more particularly sodium carbonate, sodium sulfate or zeolites.

The polymer granules have carrier material contents below 50% by weight, based on the final granules. Since highly concentrated polymer granules are preferred for the purposes of the invention, carrier material contents below 40% by weight and more particularly below 25% by weight are particularly preferred.

Spherical granules in the context of the invention are granules which, simply on visual examination, have a surface with no significant protuberances and, when viewed in all spatial directions, have the same dimensions. Microscopic examination of the granules according to the invention confirms this impression. In preferred granules, the three diameters of the particles standing vertically on one another differ from one another by less than 30% of the largest diameter. According to the invention, spherical granules where the three diameters differ by less than 20% of that diameter are particularly preferred.

The present invention also relates to detergents or cleaning compositions which, besides surfactant-containing constituents, contain soluble polymer granules according to the invention or polymer granules produced by the process according to the invention.

Besides the compounds mentioned, the detergents or cleaning compositions according to the invention, which may be present as granules, powder- or tablet-form solids or other shaped bodies, may basically contain any known ingredients typical of such compositions. Preferred compositions according to the invention are granular compositions, more particularly those formed by mixing various granules of detergents and/or cleaning components.

Other ingredients of the detergents according to the invention include, above all, anionic, nonionic, cationic, amphoteric and/or zwitterionic surfactants.

Suitable anionic surfactants are in particular soaps and those containing sulfate or sulfonate groups. Suitable surfactants of the sulfonate type are preferably $C_{9-13}$ alkyl benzenesulfonates, olefin sulfonates, i.e. mixtures of alkene and hydroxyalkane sulfonates, and the disulfonates obtained, for example, from $C_{12-18}$ monoolefins with an internal or terminal double bond by sulfonation with gaseous sulfur trioxide and subsequent alkaline or acidic hydrolysis of the sulfonation products. Other suitable surfactants of the sulfonate type are the alkane sulfonates obtained from $C_{12-18}$ alkanes, for example by sulfochlorination or sulfoxidation and subsequent hydrolysis or neutralization. The esters of α-sulfofatty acids (ester sulfonates), for example the α-sulfonated methyl esters of hydrogenated coconut oil, palm kernel oil or tallow fatty acids, which are obtained by α-sulfonation of the methyl esters of fatty acids of vegetable and/or animal origin containing 8 to 20 carbon atoms in the fatty acid molecule and subsequent neutralization to water-soluble monosalts are also suitable. The esters in question are preferably the α-sulfonated esters of hydrogenated coconut oil, palm oil, palm kernel oil or tallow fatty acid, although sulfonation products of unsaturated fatty acids, for example oleic acid, may also be present in small quantities, preferably in quantities of not more than about 2 to 3% by weight. α-Sulfofatty acid alkyl esters with an alkyl chain of not more than 4 carbon atoms in the ester group, for example methyl esters, ethyl esters, propyl esters and butyl esters, are particularly preferred. The methyl esters of α-sulfofatty acids (MES) and saponified disalts thereof are used with particular advantage.

Other suitable anionic surfactants are sulfonated fatty acid glycerol esters, i.e. the monoesters, diesters and triesters and mixtures thereof which are obtained where production is carried out by esterification of a monoglycerol with 1 to 3 moles of fatty acid or in the transesterification of triglycerides with 0.3 to 2 moles of glycerol.

Preferred alk(en)yl sulfates are the alkali metal salts and, in particular, the sodium salts of the sulfuric acid semiesters of $C_{12-18}$ fatty alcohols, for example cocofatty alcohol, tallow fatty alcohol, lauryl, myristyl, cetyl or stearyl alcohol, or $C_{10-20}$ oxoalcohols and the corresponding semiesters of secondary alcohols with the same chain length. Other preferred alk(en)yl sulfates are those with the chain length mentioned which contain a synthetic, linear alkyl chain based on a petrochemical and which are similar in their degradation behavior to the corresponding compounds based on oleochemical raw materials. $C_{12-16}$ alkyl sulfates and $C_{12-15}$ alkyl sulfates and also $C_{14-15}$ alkyl sulfates are particularly preferred from the washing performance perspective. Other suitable anionic surfactants are 2,3-alkyl sulfates which may be produced, for example, in accordance with U.S. Pat. No. 3,234,258 or U.S. Pat. No. 5,075,041 and which are commercially obtainable as products of the Shell Oil Company under the name of DAN®.

The sulfuric acid monoesters of linear or branched $C_{7-21}$ alcohols ethoxylated with 1 to 6 moles of ethylene oxide, such as 2-methyl-branched $C_{9-11}$ alcohols containing on average 3.5 moles of ethylene oxide (EO) or $C_{12-18}$ fatty alcohols containing 1 to 4 EO, are also suitable. In view of their high foaming capacity, they are normally used in only relatively small quantities, for example in quantities of 1 to 5% by weight, in detergents.

Other preferred anionic surfactants are the salts of alkyl sulfosuccinic acid which are also known as sulfosuccinates or as sulfosuccinic acid esters and which represent monoesters and/or diesters of sulfosuccinic acid with alcohols, preferably fatty alcohols and, more particularly, ethoxylated fatty alcohols. Preferred sulfosuccinates contain $C_{8-18}$ fatty alcohol molecules or mixtures thereof. Particularly preferred sulfosuccinates contain a fatty alcohol molecule derived from ethoxylated fatty alcohols which, considered in isolation, represent nonionic surfactants (for a description, see below). Of these sulfosuccinates, those of which the fatty alcohol molecules are derived from narrow-range ethoxylated fatty alcohols are particularly preferred. Alk(en)yl succinic acid preferably containing 8 to 18 carbon atoms in the alk(en)yl chain or salts thereof may also be used.

Other suitable anionic surfactants are fatty acid derivatives of amino acids, for example of N-methyl taurine (taurides) and/or of N-methyl glycine (sarcosides). The sarcosides or rather sarcosinates, above all sarcosinates of higher and optionally mono- or poly-unsaturated fatty acids, such as oleyl sarcosinate, are particularly preferred.

Other suitable anionic surfactants are, in particular, soaps which are used, for example, in quantities of 0.2 to 5% by weight. Suitable soaps are, in particular, saturated fatty acid soaps, such as the salts of lauric acid, myristic acid, palmitic acid, stearic acid, hydrogenated erucic acid and behenic acid, and soap mixtures derived in particular from natural fatty acids, for example coconut oil, palm kernel oil or tallow fatty acids.

The anionic surfactants, including the soaps, may be present in the form of their sodium, potassium or ammonium salts and as soluble salts of organic bases, such as mono-, di- or triethanolamine. The anionic surfactants are preferably present in the form of their sodium or potassium salts and, more preferably, in the form of their sodium salts. Anionic surfactants are present in detergents according to the invention in quantities of preferably 1% by weight to 35% by weight and, more preferably, 5% by weight to 30% by weight.

Preferred nonionic surfactants are alkoxylated, advantageously ethoxylated, more particularly primary alcohols preferably containing 8 to 18 carbon atoms and an average of 1 to 12 moles of ethylene oxide (EO) per mole of alcohol, in which the alcohol residue may be linear or, preferably, 2-methyl-branched or may contain linear and methyl-branched residues in the form of the mixtures typically present in oxoalcohols. However, alcohol ethoxylates containing linear residues of alcohols of native origin with 12 to 18 carbon atoms, for example coconut oil, palm oil, tallow fatty alcohol or oleyl alcohol, and an average of 2 to 8 EO per mole of alcohol are particularly preferred. Preferred ethoxylated alcohols include, for example, $C_{12-14}$ alcohols containing 3 EO or 4 EO, $C_{9-11}$ alcohols containing 7 EO, $C_{13-15}$ alcohols containing 3 EO, 5 EO, 7 EO or 8 EO, $C_{12-18}$ alcohols containing 3 EO, 5 EO or 7 EO and mixtures thereof, such as mixtures of $C_{12-14}$ alcohol containing 3 EO and $C_{12-18}$ alcohol containing 7 EO. The degrees of ethoxylation mentioned are statistical mean values which, for a special product, may be either a whole number or a broken number. Preferred alcohol ethoxylates have a narrow homolog distribution (narrow range ethoxylates, NRE). In addition to these nonionic surfactants, fatty alcohols containing more than 12 EO may also be used, as described above. Examples of such fatty alcohols are (tallow) fatty alcohols containing 14 EO, 16EO, 20EO, 25 EO, 30 EO or 40 EO.

The nonionic surfactants also include alkyl glycosides corresponding to the general formula $RO(G)_x$ where R is a primary linear or methyl-branched, more particularly 2-methyl-branched, aliphatic radical containing 8 to 22 and preferably 12 to 18 carbon atoms and G stands for a glycose unit containing 5 or 6 carbon atoms, preferably glucose. The degree of oligomerization x, which indicates the distribution of monoglycosides and oligoglycosides and which, as an analytically determined quantity, may also be a broken number, is a number of 1 to 10, preferred values for x being 1.2 to 1.4.

Other suitable nonionic surfactants are polyhydroxyfatty acid amides corresponding to formula (I):

(I)

in which $R^1CO$ is an aliphatic acyl group containing 6 to 22 carbon atoms, $R^2$ is hydrogen, an alkyl or hydroxyalkyl group containing 1 to 4 carbon atoms and [Z] is a linear or branched polyhydroxyalkyl group containing 3 to 10 carbon atoms and 3 to 10 hydroxyl groups. The polyhydroxyfatty acid amides are preferably derived from reducing sugars containing 5 or 6 carbon atoms, more particularly glucose. The group of polyhydroxyfatty acid amides also includes compounds corresponding to formula (II):

(II)

in which $R^3$ is a linear or branched alkyl or alkenyl group containing 7 to 12 carbon atoms, $R^4$ is a linear, branched or cyclic alkylene group or an arylene group containing 2 to 8 carbon atoms and $R^5$ is a linear, branched or cyclic alkyl group or an aryl group or an oxyalkyl group containing 1 to 8 carbon atoms, $C_{1-4}$ alkyl or phenyl groups being preferred, and [Z] is a linear polyhydroxyalkyl group, of which the alkyl chain is substituted by at least two hydroxyl groups, or alkoxylated, preferably ethoxylated or propoxylated, derivatives of that group. Here, too, [Z] is preferably obtained by reductive amination of a sugar, for example glucose, fructose, maltose, lactose, galactose, mannose or xylose. The N-alkoxy- or N-aryloxy-substituted compounds may then be converted into the required polyhydroxyfatty acid amides by reaction with fatty acid methyl esters in the presence of an alkoxide as catalyst, for example in accordance with the teaching of International patent application WO 95/07331.

Another class of preferred nonionic surfactants which are used either as sole nonionic surfactant or in combination with other nonionic surfactants, particularly together with alkoxylated fatty alcohols and/or alkyl glycosides, are alkoxylated, preferably ethoxylated or ethoxylated and propoxylated, fatty acid alkyl esters preferably containing 1 to 4 carbon atoms in the alkyl chain, more particularly the fatty acid methyl esters which are described, for example, in Japanese patent application JP 58/217598 or which are preferably produced by the process described in International patent application WO 90/13533.

Nonionic surfactants of the amine oxide type, for example N-cocoalkyl-N,N-dimethylamine oxide and N-tallowalkyl-N,N-dihydroxyethyl amine oxide, and the fatty acid alkanolamide type are also suitable. The quantity in which these nonionic surfactants are used is preferably no more, in particular no more than half, the quantity of ethoxylated fatty alcohols used.

Other suitable surfactants are so-called gemini surfactants. Gemini surfactants are generally understood to be compounds which contain two hydrophilic groups per molecule. These groups are generally separated from one another by a so-called "spacer". The spacer is generally a carbon chain which should be long enough for the hydrophilic groups to have a sufficient spacing to be able to act independently of one another. Gemini surfactants are generally distinguished by an unusually low critical micelle concentration and by an ability to reduce the surface tension of water to a considerable extent. In exceptional cases, however, gemini surfactants are not only understood to be dimeric surfactants, but also trimeric surfactants. Suitable gemini surfactants are, for example, the sulfated hydroxy mixed ethers according to German patent application DE 43 21 022 and the dimer alcohol bis- and trimer alcohol tris-sulfates and -ether sulfates according to German patent application DE 195 03 061. The end-capped dimeric and trimeric mixed ethers according to earlier German patent application DE 195 13 291 are distinguished in particular by their bifunctionality and multifunctionality. Thus, the end-capped surfactants mentioned exhibit good wetting properties and are low-foaming so that they are particularly suitable for use in machine washing or cleaning processes. However, the gemini polyhydroxyfatty amides or poly-polyhydroxyfatty acid amides described in International patent applications WO 95/19953, WO 95/19954 and WO 95/19955 may also be used.

The detergents according to the invention also contain a builder system consisting of at least one organic and/or inorganic builders. Useful organic builders besides the polymeric polycarboxylates according to the invention are, for example, the polycarboxylic acids usable, for example, in the form of their sodium salts, such as citric acid, adipic acid, succinic acid, glutaric acid, tartaric acid, sugar acids, aminocarboxylic acids, nitrilotriacetic acid (NTA), providing its use is not ecologically unsafe, and mixtures thereof. Preferred salts are the salts of the polycarboxylic acids, such as citric acid, adipic acid, succinic acid, glutaric acid, tartaric acid, sugar acids and mixtures thereof. The acids per se may also be used. Besides their builder effect, the acids typically have the property of an acidifying component and hence, as in the granules according to the invention for example, are also used to establish a lower and more mild pH value in laundry detergents or cleaning compositions. Citric acid, succinic acid, glutaric acid, adipic acid, gluconic acid and mixtures thereof are particularly mentioned in this regard. Other suitable organic builders are dextrins which are preferably used in the form of the compounds according to the invention and which have already been described in the foregoing. Other suitable co-builders are oxydisuccinates and other derivatives of disuccinates, preferably ethylenediamine disuccinate. The glycerol disuccinates and glycerol trisuccinates described, for example, in U.S. Pat. No. 4,524,009, in U.S. Pat. No. 4,639,325, in European patent application EP-A-0 150 930 and in Japanese patent application JP 93/339896 are also particularly preferred in this connection. The quantifies used in zeolite-containing and/or silicate-containing formulations are from 3 to 15% by weight. Other useful organic co-builders are, for example, acetylated hydroxycarboxylic acids and salts thereof which may optionally be present in lactone form and which contain at least 4 carbon atoms, at least one hydroxy group and at most two acid groups. Co-builders such as these are described, for example, in International patent application WO 95/20029. Other suitable builders are the oxidation products of carboxyl-containing polyglucosans and/or water-soluble salts thereof which are described, for example, in International patent application WO-A-93/08251 or of which the production is described, for example, in International patent application WO-A-93/16110. Oxidized oligosaccharides according to earlier German patent application DE 196 00 018.1 are also suitable. Other preferred builders are polymeric aminodicarboxylic acids, salts or precursors thereof. Particular preference is attributed to polyaspartic acids or salts and derivatives thereof which, according to German patent application DE 195 40 086.0, are also said to have a bleach-stabilizing effect in addition to their co-builder properties. Other suitable builders are polyacetals which may be obtained by reaction of dialdehydes with polyol carboxylic acids containing 5 to 7 carbon atoms and at least three hydroxyl groups, for example as described in European patent application EP-A-0 280 223. Preferred polyacetals are obtained from dialdehydes, such as glyoxal, glutaraldehyde, terephthalaldehyde and mixtures thereof and from polyol carboxylic acids, such as gluconic acid and/or glucoheptonic acid.

A preferred inorganic builder is finely crystalline, synthetic zeolite containing bound water, preferably zeolite A, X and/or P. Mixtures of A, X and/or P are also suitable. A particularly preferred zeolite P is, for example, zeolite MAP® (a product of Crosfield). A co-crystallized sodium/potassium-aluminium silicate of zeolite A and zeolite X, which is marketed, for example, under the name of VEGOBOND AX® (by Condea Augusta S.p.A.), is also of particular interest. The zeolite may be used as a spray-dried powder or even as an undried stabilized suspension still moist from its production. Where the zeolite is used in the form of a suspension, the suspension may contain small additions of nonionic surfactants as stabilizers, for example 1 to 3% by weight, based on zeolite, of ethoxylated $C_{12-18}$ fatty alcohols containing 2 to 5 ethylene oxide groups, $C_{12-14}$ fatty alcohols containing 4 to 5 ethylene oxide groups or ethoxylated isotridecanols. Suitable zeolites have a mean particle size of less than 10 μm (volume distribution, as measured by the Coulter Counter method) and contain preferably 10 to 22% by weight and, more preferably, 15 to 22% by weight of bound water.

Suitable substitutes or partial substitutes for the zeolite are layer silicates or natural and synthetic origin. Layer silicates such as these are known, for example, from patent applications DE-B-23 34 899, EP-A-0 026 529 and DE-A-35 26 405. Their suitability is not confined to a particular composition or structural formula, although smectites and especially bentonites are preferred. Crystalline layer-form sodium silicates corresponding to the general formula $NaMSi_xO_{2x+1} \cdot yH_2O$, where M is sodium or hydrogen, x is a number of 1.9 to 4 and y is a number of 0 to 20, preferred values for x being 2, 3 or 4, are also suitable substitutes for zeolites and phosphates. Crystalline layer silicates such as these are described, for example, in European patent application EP-A-0 164 514. Preferred crystalline layer silicates corresponding to the above formula are those in which M is sodium and x assumes the value 2 or 3. Both β- and δ-sodium disilicates $Na_2Si_2O_5 \cdot yH_2O$ are particularly preferred.

Other preferred builders are amorphous sodium silicates with a modulus ($Na_2O:SiO_2$ ratio) of 1:2 to 1:3.3, preferably 1:2 to 1:2.8 and more preferably 1:2 to 1:2.6 which dissolve with delay and exhibit multiple wash cycle properties. The delay in dissolution in relation to conventional amorphous sodium silicates can have been obtained in various ways, for example by surface treatment, compounding, compacting or by overdrying. In the context of the invention, the term "amorphous" is also understood to encompass "X-ray amorphous". In other words, the silicates do not produce any of the sharp X-ray reflexes typical of crystalline substances in X-ray diffraction experiments, but at best one or more maxima of the scattered X-radiation which have a width of several degrees of the diffraction angle. Particularly good builder properties may even be achieved where the silicate particles produce crooked or even sharp diffraction maxima in electron diffraction experiments. This may be interpreted to mean that the products have microcrystalline regions between 10 and a few hundred nm in size, values of up to at most 50 nm and, more particularly, up to at most 20 nm being preferred. So-called X-ray amorphous silicates such as these, which also dissolve with delay in relation to conventional waterglasses, are described for example in German patent application DE-A44 00 024. Compacted amorphous silicates, compounded amorphous silicates and overdried X-ray-amorphous silicates are particularly preferred.

The generally known phosphates may of course also be used as builders providing their use is not ecologically problematical. The sodium salts of orthophosphates, pyrophosphates and, in particular, tripolyphosphates are particularly suitable. Their content is generally no more than 25% by weight and preferably no more than 20% by weight, based on the final detergent. In some cases, it has been found that tripolyphosphates in particular, even in small quantities of up to at most 10% by weight, based on the final detergent, produce a synergistic improvement in multiple wash cycle performance in combination with other builders.

Among the compounds yielding $H_2O_2$ in water which serve as bleaching agents, sodium perborate monohydrate or tetrahydrate and sodium percarbonate are particularly important. Other useful bleaching agents are, for example, peroxypyrophosphates, citrate perhydrates and $H_2O_2$- yielding peracidic salts or peracids, such as perbenzoates, peroxophthalates, diperazelaic acid, phthaloiminoperacid or diperdodecane dioic acid. The content of bleaching agents in the detergents is from 0 to 30% by weight and more particularly from 5 to 25% by weight, perborate monohydrate or percarbonate advantageously being used.

In order to obtain an improved bleaching effect where washing is carried out at temperatures of 60° C. or lower, bleach activators may be incorporated in the preparations. Examples of bleach activators are N-acyl or O-acyl compounds which form organic peracids with $H_2O_2$, preferably polyacylated alkylene diamines, such as N,N'-tetraacylated diamines, acylated glycolurils, more especially tetraacetyl glycoluril, N-acylated hydantoins, hydrazides, triazoles, triazines, urazoles, diketopiperazines, sulfuryl amides and cyanurates, also carboxylic acid esters, such as p-(alkanoyloxy)-benzenesulfonates, more especially sodium isononanoyloxy-benzenesulfonate, and p-(alkenoyloxy)-benzenesulfonates; caprolactam derivatives, carboxylic anhydrides, such as phthalic anhydride, and esters of polyols, such as glucose pentaacetate. Other known bleach activators are the acetylated mixtures of sorbitol and mannitol described, for example, in European patent application EP-A0 525 239 and acetylated pentaerythritol. The content of bleach activators in the bleach-containing detergent is in the usual range, preferably between 1 and 10% by weight and more preferably between 3 and 8% by weight. Particularly preferred bleach activators are N,N,N',N'-tetraacetyl ethylenediamine (TAED), 1,5-diacetyl-2,4-dioxohexahydro-1,3,5-triazine (DADHT) and acetylated sorbitol-mannitol mixtures (SORMAN). The bleach activator can have been coated in known manner with membrane materials or granulated or extruded/pelleted, optionally using auxiliaries, especially methyl celluloses and/or carboxymethyl celluloses, and—if desired—may contain other additives, for example dye. Granules such as these preferably contain more than 70% by weight and, more preferably, from 90 to 99% by weight of bleach activator. A bleach activator which forms peracetic acid under washing conditions is preferably used.

In addition to or instead of the conventional bleach activators mentioned above, the sulfonimines known from European patents EP 0 446 982 and EP 0 453 003 and/or bleach-boosting transition metal salts or transition metal complexes may also be present as so-called bleach catalysts. Suitable transition metal compounds include, in particular, the manganese-, iron-, cobalt-, ruthenium- or molybdenum-salen complexes known from German patent application DE 195 29 905 and the N-analog compounds thereof known from German patent application DE 196 20 267, the manganese-, iron-, cobalt-, ruthenium- or molybdenum-carbonyl complexes known from German patent application DE 195 36 082, the manganese, iron, cobalt, ruthenium, molybdenum, titanium, vanadium and copper complexes with nitrogen-containing tripod ligands described in German patent application DE 196 05 688, the cobalt-, iron-, copper- and ruthenium-amine complexes known from German patent application DE 196 20 411, the manganese, copper and cobalt complexes described in German patent application DE 44 16 438, the cobalt complexes described in European patent application EP 0 272 030, the manganese complexes known from European patent application EP 0 693 550, the manganese, iron, cobalt and copper complexes known from European patent EP 0 392 592 and/or the manganese complexes described in European patent EP 0 443 651 or in European patent applications EP 0 458 397, EP 0 458 398, EP 0 549 271, EP 0 549 272, EP 0 544 490 and EP 0 544 519. Combinations of bleach activators and transition metal bleach catalysts are known, for example, from German patent application DE 196 13 103 and from international patent application WO 95/27775. Bleach-boosting transition metal complexes, more particularly with the central atoms Mn, Fe, Co. Cu, Mo. V, Ti and/or Ru, are used in typical quantities, preferably in a quantity of up to 1% by weight, more preferably in a quantity of 0.0025% by weight to 0.25% by weight and most preferably in a quantity of 0.01% by weight to 0.1% by weight, based on the preparation as a whole.

The enzymes optionally present in the detergents according to the invention include proteases, amylases, pullulanases, cellulases, cutinases and/or lipases, for example proteases, such as BLAP®, Optimased®, Opticlean®, Maxacal®, Maxapem®, Durazym®, Purafect®OxP, Esperase® and/or Savinase®, amylases, such as Termamyl®, Amylase-LT®, Maxamyl®, Duramyl®, Purafect®OxAm, cellulases, such as Celluzyme®, Carezyme®, KAC® and/or the cellulases and lipases known from International patent applications WO 96/34108 and WO 98/34092, such as Lipolase®, Lipomax®, Lumafast® and/or Lipozym®. The enzymes used may be adsorbed to supports and/or encapsulated in membrane materials for protection against premature inactivation, for example as described in International patent applications WO 92/11347 or WO 94/23005. They are present in detergents according to the invention in quantities of preferably up to 10% by weight and, more preferably, from 0.05% by weight to 5% by weight, enzymes stabilized against oxidative degradation, as known for example from International patent applications WO 94/02597, WO 94/02618, WO 94/18314, WO 94/23053 or WO 95/07350, being particularly preferred. If the above-described starch-containing compounds are to be used in the detergents, the detergents preferably contain no amylases.

Suitable stabilizers, especially for per compounds and enzymes sensitive to heavy metal ions, are the salts of polyphosphonic acids, more particularly 1-hydroxyethane-1,1-diphosphonic acid (HEDP), diethylene-triamine pentamethylenephosphonic acid (DETPMP) or ethylenediamine tetramethylene phosphonic acid.

The detergents may also contain components with a positive effect on the removability of oil and fats from textiles by washing. This effect becomes particularly clear when a textile which has already been repeatedly washed with a detergent according to the invention containing this oil- and fat-dissolving component is soiled. Preferred oil- and fat-dissolving components include, for example, non-ionic cellulose ethers, such as methyl cellulose and methyl hydroxypropyl cellulose containing 15 to 30% by weight of methoxyl groups and 1 to 15% by weight of hydroxypropoxyl groups, based on the nonionic cellulose ether, and the polymers of phthalic acid and/or terephthalic acid known from the prior art or derivatives thereof, more particularly polymers of ethylene terephthalates and/or polyethylene glycol terephthalates or anionically and/or nonionically modified derivatives thereof. Of these, the sulfonated derivatives of phthalic acid and terephthalic acid polymers are particularly preferred.

Where the detergents are used in washing machines, it can be of advantage to add typical foam inhibitors to them. Suitable foam inhibitors are, for example, soaps of natural or synthetic origin which have a high percentage content of $C_{18-24}$ fatty acids. Suitable non-surface-active foam inhibitors are, for example, organopolysiloxanes and mixtures thereof with microfine, optionally silanized, silica and also paraffins, waxes, microcrystalline waxes and mixtures thereof with silanized silica or bis-stearyl ethylenediamide. Mixtures of different foam inhibitors, for example mixtures of silicones, paraffins and waxes, may also be used with advantage. The foam inhibitors, more particularly silicone- and/or paraffin-containing foam inhibitors, are preferably fixed to a granular water-soluble or water-dispersible support. Mixtures of paraffins and bis-stearyl ethylenediamides are particularly preferred.

The function of redeposition inhibitors is to keep the soil detached from the fibers suspended in the wash liquor and thus to prevent the soil from being re-absorbed by the washing. Suitable redeposition inhibitors are water-soluble, generally organic colloids, for example the water-soluble salts of polymeric carboxylic acids, glue, gelatine, salts of ether carboxylic acids or ether sulfonic acids of starch or cellulose or salts of acidic sulfuric acid esters of cellulose or starch. Water-soluble polyamides containing acidic groups are also suitable for this purpose. Soluble starch preparations and other starch products than those mentioned above, for example degraded starch, aldehyde starches, etc., may also be used. Polyvinyl pyrrolidone, especially in the form of PVP granules, is preferably used in the detergents according to the invention. Cellulose ethers, such as carboxymethyl cellulose (sodium salt), methyl cellulose, hydroxyalkyl cellulose, and mixed ethers, such as methyl hydroxyethyl cellulose, methyl hydroxypropyl cellulose, methyl carboxymethyl cellulose and mixtures thereof, are also preferably used. Redeposition inhibitors, such as PVP, are normally used in quantities of 0.1 to 5% by weight, based on the detergent.

The detergents may contain derivatives of diaminostilbene disulfonic acid or alkali metal salts thereof as optical brighteners. Suitable optical brighteners are, for example, salts of 4,4'-bis-(2-anilino-4-morpholino-1,3,5-triazinyl-6-amino)-stilbene-2,2'-disulfonic acid or compounds of similar structure which contain a diethanolamino group, a methylamino group and anilino group or a 2-methoxyethylamino group instead of the morpholino group. Brighteners of the substituted diphenyl styryl type, for example alkali metal salts of 4,4'-bis-(2-sulfostyryl)-diphenyl, 4,4'-bis-(4-chloro-3-sulfostyryl)-diphenyl or 4-(4-chlorostyryl)-4'-(2-sulfostyryl)-diphenyl, may also be present. Mixtures of the brighteners mentioned may also be used.

In addition to the ingredients mentioned, the detergents may also contain other known additives typically used in laundry detergents, dishwashing detergents and cleaners, for example small quantities of neutral filler salts and dyes and perfumes, opacifiers or pearlizers.

The bulk density of the advantageously granular detergents is preferably at least about 600 g/l and more preferably from 650 to 1100 g/l. However, detergents with a lower bulk density may also readily be produced. This can be particularly preferred where the detergents are assembled from granular individual components on the building block principle.

EXAMPLES

List of Reference Numerals Used in FIGS. 1 and 2:
1 Fluidized bed chamber
2 Outer wall
3 Air injection tube, 2x
4 Product discharge with grading effect
5 Inflowing air distribution chamber
6 Inflowing air channel
7 Diffusor
8 Stabilizing chamber
9 Waste air outlet
α Angle of incidence An aqueous polymer solution, to which the carrier material was added as required, was sprayed through a two-component nozzle into a modified AGT 400 fluidized bed dryer (manufacturer: Glatt, 400 mm base diameter) with a Conidur base plate. The modification illustrated in FIGS. 1 and 2 was made to the fluidized bed dryer.

Compounds with the compositions shown in Table 2 were obtained with the process parameters listed in Table 1. 10% of the total incoming air was delivered through the additional air injection tubes.

To produce the compound E5, a homogeneous mixture of the dextrose syrup with the solution of the polymeric polycarboxylate was sprayed. To produce the compound E6, the maltodextrin was used in powder form and was granulated by spraying on the polycarboxylate solution and, at the same time, was dried in such a way that granules of which the outer shell is formed by the polymeric polycarboxylate were formed. The alkyl benzenesulfonate in E7 was used in the form of a paste which was sprayed together with the polymer solution.

TABLE 1 process parameters

| | E1 | E2 | E3 | E4 | E5 | E6 | E7 |
|---|---|---|---|---|---|---|---|
| Polymer content of the solution [% by weight] | 40 | 40 | 40 | 40 | 40 | 40 | 45 |
| Bottom air temperature [° C.] | 164 | 156 | 158 | 165 | 130 | 130 | 150 |
| Fluidizing air temperature [° C.] | 85 | 91 | 90 | 92 | 75 | 75 | 85 |
| Inflowing air [m$^3$/h] | 670 | 760 | 740 | 735 | 735 | 735 | 650 |
| Throughput of liquid [kg/h] | 24 | 24 | 25 | 25 | 21 | 21 | 15 |

TABLE 2 composition of the compounds

| | E1 | E2 | E3 | E4 | E5 | E6 | E7 |
|---|---|---|---|---|---|---|---|
| Sokalan CP5 ® [% by wt.] | 50 | 80 | 84 | 88 | 49 | 39 | — |
| Starch [% by wt.] | — | — | — | — | 43$^1$ | 54$^2$ | — |
| Sokalan PA 30 ® [% by wt.] | — | — | — | — | — | — | 31 |
| Zeolite A [% by wt.] | — | — | — | 2.4 | — | — | — |
| Sodium carbonate [% by wt.] | 45 | — | — | — | — | — | — |
| Sodium sulfate [% by wt.] | — | 12 | 8 | — | — | — | 53 |
| ABS | — | — | — | — | — | — | 13.6 |
| Water [% by wt.] | 5 | 8 | 8 | 8.3 | 8.4 | 7 | 2.4 |
| Particle size distribution [% by wt.] | | | | | | | |
| <0.4 mm | 1 | 5 | 19 | 5 | — | 78 | 16.1 |
| >0.4 mm | 25 | 51 | 61 | 32 | 0.3 | 20 | 63.9 |
| >0.8 mm | 19 | 25 | 13 | 18 | 1.2 | 1.5 | 15.0 |
| >1.0 mm | 44 | 18 | 7 | 40 | 40.0 | 0.8 | 5.0 |
| >1.6 mm | 11 | 1 | — | 5 | 58.5 | — | 0 |
| Bulk density [g/l] | 320–350 | 350–430 | 425–490 | 300 | 315 | 520 | 750 |

The particle size distribution was measured directly on discharge from the fluidized—no coarse particles were removed by sieving.

The following products were used as raw materials:

| | |
|---|---|
| Sokalan CP5 ®: | acrylic/maleic acid copolymer (a product of BASF) |
| Starch: | ¹Cerestar C* Plus 16862 |
| | ²Cerestar C* Dry MD 01910 |
| Sokalan PA 30 ®: | acrylic acid polymer (a product of BASF) |

In order to determine solubility behavior (L test), 8 g of the granules to be tested were scattered while stirring into a 2 liter glass beaker (800 r.p.m. with a laboratory stirrer/propeller stirrer head centrally arranged 1.5 cm from the bottom of the glass beaker) and stirred for 1.5 minutes at 30° C. The test was carried out with water having a hardness of 16°d. The wash liquor was then poured off through a sieve (80 $\mu$m). The glass beaker was rinsed out over the sieve with a very little cold water. A double determination was carried out. The sieves were dried to constant weight in a drying cabinet at 40° C.±2° C. and the residue was weighed out. In the case of the Examples according to the invention, no residue could be found.

All the granules E1 to E7 produced in accordance with the invention can be stored in air in the medium term without becoming tacky or losing their flowability. Flowability was tested by a lump test.

To this end, 15 ml of the particular compound were measured off into a 25 ml measuring cylinder and transferred to a stainless steel cylinder which stood in a china bowl or the like. A stainless steel pestle was then inserted into the cylinder without compressing the powder and a weight of 500 g was applied. After 30 mins. and 24 hours, the weight was removed, the cylinder was raised and the plug was pushed out by the pestle. The test was carried out at room temperature and at 40° C. Under all the conditions mentioned, the plugs of the compounds of Examples E1 to E7 all disintegrated immediately on being pushed out.

What is claimed is:

1. A process for the production of soluble polymer granules suitable as an additive in detergents and/or cleaning compositions, comprising the steps of simultaneously granulating and drying, in a fluidized bed dryer having a diffusor plate, a water-based preparation comprising at least 30% by weight of one or more soluble polymers, in which dryer one or more air inlets above the diffusor plate produce an eddy flow in the bed about the vertical axis of the dryer.

2. The process of claim 1, carried out in a round fluidized bed dryer having an additional air supply system disposed above the diffusor plate, said air supply system having at least two air injection tubes arranged at a uniform distance apart and at the same level above the diffusor at an angle of incidence $\alpha$ of at least 30° and at most 90°.

3. The process of claim 2, wherein the air injection tubes are situated above the diffusor plate at a maximum of 50% of the resting height of the bed material.

4. The process of claim 3, wherein the air injection tubes are situated above the diffusor plate at a maximum of 10% to 30% of the resting height of the bed material.

5. The process of claim 2, wherein the additional air supply system comprises more than two air injection tubes.

6. The process of claim 5, wherein the additional air supply system comprises more than four air injection tubes.

7. The process of claim 2, wherein the angle of incidence of the injection tubes is 30° to 75°.

8. The process of claim 4, wherein the angle of incidence of the injection tubes is 45° to 70°.

9. The process of claim 8, wherein the angle of incidence of the injection tubes is 60°.

10. The process of claim 1, wherein the one or more soluble polymers comprise one or more polymeric polycarboxylates.

11. The process of claim 10, wherein the one or more polymeric polycarboxylates comprise one or more homopolymers or copolymers of acrylic, methacrylic, or maleic acid or water-soluble salts of these polymers.

12. The process of claim 11, wherein the one or more polymeric polycarboxylates have a molecular weight of 500 to 100,000 g/mol.

13. The process of claim 1, wherein the one or more soluble polymers comprise one or more homopolymers or copolymers of vinyl pyrrolidone having a molecular weight of 1000 to 200,000 g/mol.

14. The process of claim 13, wherein the one or more homopolymers or copolymers of vinyl pyrrolidone have a molecular weight of 1000 to 100,000 g/mol.

15. The process of claim 1, wherein the water-based preparation comprises one or more dextrins.

16. The process of claim 15, wherein the one or more dextrins are introduced into the dryer in solid form.

17. The process of claim 15, wherein the water-based preparation comprises the one or more dextrins and one or more polymeric polycarboxylates in the form of a homogeneous solution of the two polymers, said solution being sprayed into a granulation chamber in the dryer.

18. The process of claim 1, wherein one or more inorganic carrier materials are admixed with the water-based preparation.

19. The process of claim 18, wherein the one or more inorganic carrier materials comprise one or more of sodium sulfate, sodium carbonate, or zeolites.

20. Soluble polymer granules suitable as an additive in detergents and/or cleaning compositions, comprising generally spherical granules containing 50% to 95% by weight of one or more soluble polymers, said polymers comprising one or more homopolymers or copolymers of vinyl pyrrolidone having a molecular weight of 1000 to 200,000 g/mol and at least one admixing component.

21. The soluble polymer granules of claim 20, wherein the one or more soluble polymers comprise one or more polymeric polycarboxylates.

22. The soluble polymer granules of claim 21, wherein the one or more polymeric polycarboxylates comprise one or more homopolymers or copolymers of acrylic, methacrylic, or maleic acid or water-soluble salts of these polymers.

23. The soluble polymer granules of claim 22, wherein the one or more polymeric polycarboxylates have a molecular weight of 500 to 100,000 g/mol.

24. The soluble polymer granules of claim 20, wherein the one or more homopolymers or copolymers of vinyl pyrrolidone have a molecular weight of 1000 to 100,000 g/mol.

25. The soluble polymer granules of claim 21, comprising one or more dextrins.

26. The soluble polymer granules of claim 25, wherein the weight ratio of dextrin to polymeric polycarboxylate in the granules is 4:1 to 1:2.

27. The soluble polymer granules of claim 20, comprising less than 40% by weight of the at least one admixing component, wherein the at least one admixing component comprises one or more inorganic carrier materials.

28. The soluble polymer granules of claim 27, wherein the one or more inorganic carrier materials comprise sodium sulfate, sodium carbonate, sodium citrate, or zeolites.

29. The soluble polymer granules of claim 27, comprising less than 25% by weight of the at least one admixing component.

30. The soluble polymer granules of claim 20, comprising 75% to 90% by weight of the one or more soluble polymers.

* * * * *

UNITED STATES PATENT AND TRADEMARK OFFICE
CERTIFICATE OF CORRECTION

PATENT NO. : 6,841,614 B1
DATED : January 11, 2005
INVENTOR(S) : Assmann et al.

It is certified that error appears in the above-identified patent and that said Letters Patent is hereby corrected as shown below:

Title page,
Item [56], References Cited, FOREIGN PATENT DOCUMENTS, delete "DE 35 24 405" and insert -- DE 35 26 405 --; delete "EP 421 644" and insert -- EP 0 421 664 --; and delete "WO92/18962" and insert -- WO92/18542 --.

Column 19,
Line 61, delete "claim 4" and insert -- claim 7 --.

Signed and Sealed this

Thirtieth Day of August, 2005

JON W. DUDAS
*Director of the United States Patent and Trademark Office*